(12) United States Patent
Yoshida et al.

(10) Patent No.: US 9,705,164 B2
(45) Date of Patent: Jul. 11, 2017

(54) METAL-AIR BATTERY AND ENERGY SYSTEM

(71) Applicant: Sharp Kabushiki Kaisha, Osaka-shi, Osaka (JP)

(72) Inventors: Akihito Yoshida, Osaka (JP); Hirotaka Mizuhata, Osaka (JP); Tomohisa Yoshie, Osaka (JP); Masaki Kaga, Osaka (JP); Shinobu Takenaka, Osaka (JP); Tomoharu Arai, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 1123 days.

(21) Appl. No.: 13/862,494

(22) Filed: Apr. 15, 2013

(65) Prior Publication Data
US 2013/0280623 A1    Oct. 24, 2013

(30) Foreign Application Priority Data
Apr. 23, 2012 (JP) ................................ 2012-097778

(51) Int. Cl.
*H01M 12/06* (2006.01)
*H01M 12/08* (2006.01)

(52) U.S. Cl.
CPC ............ *H01M 12/06* (2013.01); *H01M 12/08* (2013.01)

(58) Field of Classification Search
CPC ...... H01M 12/06; H01M 10/42; H01M 8/083; H01M 4/86; H01M 4/8605
See application file for complete search history.

(56) References Cited

U.S. PATENT DOCUMENTS

| | | | | |
|---|---|---|---|---|
| 3,915,745 A | * | 10/1975 | Ikeda | .................... H01M 10/42 429/406 |
| 5,228,958 A | * | 7/1993 | Goldstein | ........... B60L 11/1874 205/602 |
| 5,582,929 A | * | 12/1996 | Dechovich | .............. H01M 2/40 429/120 |
| 5,599,637 A | | 2/1997 | Pecherer et al. | |
| 8,173,307 B2 | | 5/2012 | Kulakov | |

(Continued)

FOREIGN PATENT DOCUMENTS

| | | |
|---|---|---|
| CN | 100459232 C | 2/2009 |
| CN | 102157764 A | 8/2011 |

(Continued)

*Primary Examiner* — Kenneth Douyette
(74) *Attorney, Agent, or Firm* — Keating & Bennett, LLP

(57) ABSTRACT

The present invention has been achieved to provide a metal-air battery that allows removal of a metallic compound without suspending power supply. The metal-air battery of the present invention includes: first and second electrolytic tanks for storing an electrolytic solution; a metallic electrode to serve as an anode provided in the first electrolytic tank; and an air electrode to serve as a cathode, wherein the metallic electrode is formed of a metal which becomes a metallic ion or composes a metallic compound in the electrolytic solution with progress of a battery reaction, the first and second electrolytic tanks are communicated with each other for allowing the electrolytic solution in the first electrolytic tank to move into the second electrolytic tank, and the metallic ion or the metallic compound in the electrolytic solution is precipitated as a metallic compound precipitate in the second electrolytic tank.

19 Claims, 12 Drawing Sheets

(56) References Cited

U.S. PATENT DOCUMENTS

| | | | | |
|---|---|---|---|---|
| 2005/0123815 A1* | 6/2005 | Tsai | ..................... | H01M 2/367 |
| | | | | 429/404 |
| 2010/0323249 A1 | 12/2010 | Fujiwara et al. | | |
| 2012/0015264 A1* | 1/2012 | Friesen | .................. | H01M 2/38 |
| | | | | 429/415 |

FOREIGN PATENT DOCUMENTS

| | | |
|---|---|---|
| CN | 102270777 A | 12/2011 |
| JP | 07-045270 A | 2/1995 |
| JP | 2005-509262 A | 4/2005 |
| JP | 2012-003940 A | 1/2012 |
| WO | 03/041211 A2 | 5/2003 |
| WO | 2009/104570 A1 | 8/2009 |

\* cited by examiner

METAL-AIR BATTERY AND ENERGY SYSTEM

CROSS-REFERENCE TO RELATED APPLICATION

This application is related to Japanese Patent Application No. 2012-097778 filed on Apr. 23, 2012, whose priority is claimed under 35 USC §119, and the disclosure of which is incorporated by reference in its entirety.

BACKGROUND OF THE INVENTION

Field of the Invention

The present invention relates to a metal-air battery and an energy system.

Description of the Related Art

Metal-air batteries including a metal electrode as an anode and an air electrode as a cathode have been attracting attention as next-generation batteries as having high energy density.

As a representative metal-air battery, a zinc-air battery may be mentioned. FIG. 10 is a schematic cross sectional view for illustrating a discharge reaction of a zinc-air battery. As illustrated in FIG. 10, the zinc-air battery has a structure having a zinc electrode 101 provided in an alkaline electrolytic solution 103 and an air electrode 105 provided on an anion exchange membrane 106 in contact with the electrolytic solution 103, and outputs power from the zinc electrode 101 and the air electrode 105 as a discharge reaction progresses. As the air electrode 105, a cathode catalyst supported on a carbon support is generally used.

In the discharge reaction in the zinc-air battery, metallic zinc from the zinc electrode 101 reacts with hydroxide ions in the alkaline electrolytic solution 103 to be zinc hydroxide, which emits electrons into the zinc electrode 101. The zinc hydroxide decomposes to produce zinc oxide as a precipitate in the electrolytic solution. In the air electrode 105, electrons, water and oxygen react to produce hydroxide ions, which are conducted through the anion exchange membrane 106 to move to the alkaline electrolytic solution 103. As such a discharge reaction progresses, metallic zinc from the zinc electrode 101 is consumed, and zinc oxide will be accumulated in the alkaline electrolytic solution 103. In order to maintain output of power by the zinc-air battery, therefore, it is necessary to supply metallic zinc to the zinc electrode 101 and to remove the zinc oxide precipitate in the alkaline electrolytic solution 103.

To this end, there have been proposed methods for supplying a metal to a metal-air battery (see Japanese Unexamined Patent Publication No. HEI 7 (1995)-45270 and Japanese Unexamined Patent Publication (Translation of PCT Application) No. 2005-509262, for example).

When a metallic compound such as zinc oxide is removed from an electrolytic solution in a conventional metal-air battery, however, the electrolytic solution as well as the metallic compound needs to be drained from an electrolytic tank, and therefore power supply by the metal-air battery needs to be suspended during the removal of the metallic compound.

SUMMARY OF THE INVENTION

In view of the above-described circumstances, the present invention has been achieved to provide a metal-air battery that allows removal of a metallic compound without suspending power supply.

The present invention provides a metal-air battery comprising: first and second electrolytic tanks for storing an electrolytic solution; a metallic electrode to serve as an anode provided in the first electrolytic tank; and an air electrode to serve as a cathode, wherein the metallic electrode is formed of a metal which becomes a metallic ion or composes a metallic compound in the electrolytic solution with progress of a battery reaction, the first and second electrolytic tanks are communicated with each other for allowing the electrolytic solution in the first electrolytic tank to move into the second electrolytic tank, and the metallic ion or the metallic compound in the electrolytic solution is precipitated as a metallic compound precipitate in the second electrolytic tank.

According to the present invention, the battery includes the first electrolytic tank for storing the electrolytic solution, the metallic electrode to serve as an anode provided in the first electrolytic tank and the air electrode to serve as a cathode, and therefore the battery can output power from the metallic electrode and the air electrode.

According to the present invention, the metallic electrode provided in the first electrolytic tank is formed of a metal which becomes a metallic ion or composes a metallic compound in the electrolytic solution with progress of the battery reaction, and the first and second electrolytic tanks are communicated with each other for allowing the electrolytic solution in the first electrolytic tank to move into the second electrolytic tank, and therefore the metallic ion or the metallic compound generated in the electrolytic solution in the first electrolytic tank can move to the second electrolytic tank.

According to the present invention, the metallic ion or the metallic compound in the electrolytic solution is precipitated as a metallic compound precipitate in the second electrolytic tank, and therefore the metallic compound precipitate can be accumulated in the second electrolytic tank. Since the metallic compound precipitate accumulated in the second electrolytic tank is removed from the second electrolytic tank, it is not necessary to drain the electrolytic solution in the first electrolytic tank during the removal of the metallic compound precipitate, and therefore it is possible to maintain progress of the battery reaction and continuously supply power using the electrolytic solution in the first electrolytic tank. In addition, since it is possible to prevent the metallic compound precipitate from being accumulated in the first electrolytic tank, supply of the metal which forms the metallic electrode to the first electrolytic tank is facilitated.

DESCRIPTION OF THE PREFERRED EMBODIMENTS

Figure 1:
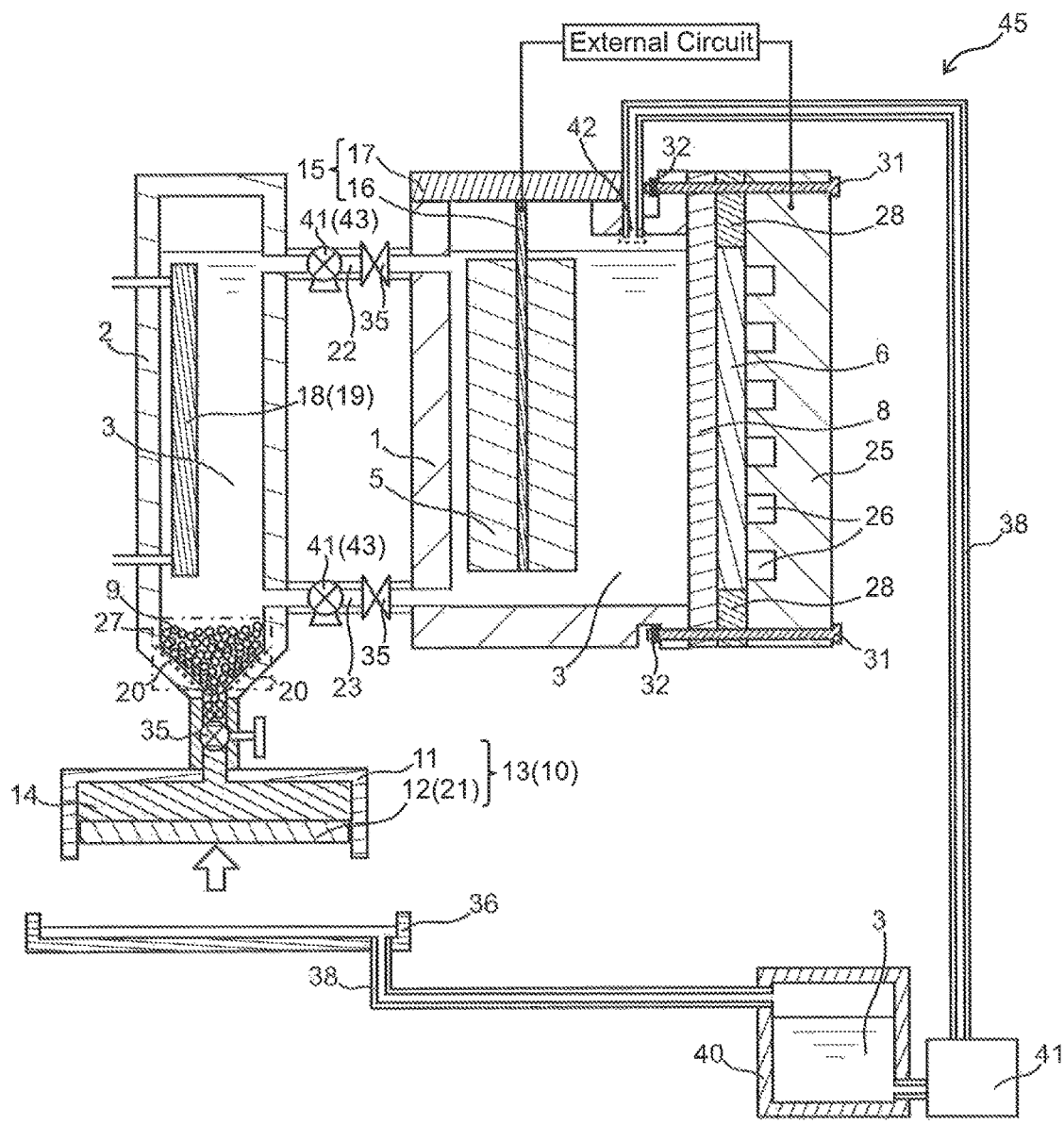
FIG. 1 is a schematic cross sectional view illustrating a configuration of a metal-air battery of an embodiment of the present invention.

A metal-air battery of the present invention comprises: first and second electrolytic tanks for storing an electrolytic solution; a metallic electrode to serve as an anode provided in the first electrolytic tank; and an air electrode to serve as a cathode, wherein the metallic electrode is formed of a metal which becomes a metallic ion or composes a metallic compound in the electrolytic solution with progress of a battery reaction, the first and second electrolytic tanks are communicated with each other for allowing the electrolytic solution in the first electrolytic tank to move into the second electrolytic tank, and the metallic ion or the metallic compound in the electrolytic solution is precipitated as a metallic compound precipitate in the second electrolytic tank.

Preferably, in the metal-air battery of the present invention, the first and second electrolytic tanks are communicated with each other so that the electrolytic solution in the first electrolytic tank flows into the second electrolytic tank and the electrolytic solution in the second electrolytic tank flows into the first electrolytic tank.

According to this configuration, the metallic ion or the metallic compound in the electrolytic solution in the first electrolytic tank can be moved into the second electrolytic tank together with the electrolytic solution. In addition, the amount of the electrolytic solution in the first electrolytic tank can be maintained by allowing the electrolytic solution after the formation of the metallic compound precipitate in the second electrolytic tank to flow from the second electrolytic tank into the first electrolytic tank.

Preferably, the metal-air battery of the present invention further comprises a drive unit for sending the electrolytic solution in such a manner that the electrolytic solution in the first electrolytic tank flows into the second electrolytic tank and the electrolytic solution in the second electrolytic tank flows into the first electrolytic tank.

According to this configuration, the metallic ion or the metallic compound in the electrolytic solution in the first electrolytic tank can be moved by the drive unit into the second electrolytic tank together with the electrolytic solution. In addition, the amount of the electrolytic solution in the first electrolytic tank can be maintained by allowing the electrolytic solution after the formation of the metallic compound precipitate in the second electrolytic tank to flow from the second electrolytic tank into the first electrolytic tank.

Preferably, in the metal-air battery of the present invention, the second electrolytic tank comprises a cooling unit, and the cooling unit cools the electrolytic solution in the second electrolytic tank.

According to this configuration, the saturation solubility of the metallic compound dissolved in the electrolytic solution can be reduced by cooling the electrolytic solution, and thereby the metallic compound precipitate can be formed in the second electrolytic tank.

Preferably, the metal-air battery of the present invention further comprises a heat recovery system, and the cooling unit is a heat absorption section of the heat recovery system.

According to this configuration, the electrolytic solution heated by the heat generated with the progress of the battery reaction is cooled by the cooling unit, and thereby the heat recovery system can recover the heat generated with the progress of the battery reaction, and the heat recovered can be utilized. Furthermore, the utilization of the heat generated with the progress of the battery reaction and the formation of the precipitate for recovering the metallic compound can be performed in the same step, and therefore the costs can be reduced. In addition, the total energy utilization efficiency can be improved, because not only can power be supplied by the metal-air battery, but the heat can also be utilized by using the heat recovery system.

Preferably, the metal-air battery of the present invention further comprises a current collector in contact with the air electrode, and the second electrolytic tank is disposed so that the electrolytic solution in the second electrolytic tank absorbs heat of the current collector.

According to this configuration, the heat generated by an electrode reaction in the air electrode can be absorbed by the electrolytic solution in the second electrolytic tank, and such an electrolytic solution can be cooled by the cooling unit. Thus, the air electrode can be efficiently cooled.

Preferably, in the metal-air battery of the present invention, the second electrolytic tank comprises an electrolytic solution concentration mechanism.

According to the configuration, the concentration of the metallic compound dissolved in the electrolytic solution in the second electrolytic tank can be increased in a part, and therefore the metallic compound precipitate can be formed in the second electrolytic tank.

Preferably, the metal-air battery of the present invention further comprises an ion exchange membrane having first and second major surfaces, and the ion exchange membrane is disposed so that the first major surface is in contact with the electrolytic solution stored in the first electrolytic tank and the second major surface opposing the first major surface is in contact with the air electrode.

According to this configuration, charges can be transferred between the electrolytic solution in the first electrolytic tank and the air electrode as ions are conducted in the ion exchange membrane, so that the battery reaction can progress. In addition, the electrolytic solution and the air electrode can be separated by the ion exchange membrane, and therefore it is possible to prevent poisoning of the air electrode due to the electrolyte included in the electrolytic solution reaching the air electrode. It is also possible to prevent excessive supply of the solvent of the electrolytic solution to the air electrode.

Preferably, the metal-air battery of the present invention further comprises a metal holder including a support having a major surface, the metallic electrode is fixed on the major surface, the metal holder is configured to allow the metallic electrode and the support to be inserted into the first electrolytic tank, and the metal for forming the metallic electrode is supplied into the first electrolytic tank by replacing the metal holder.

According to this configuration, the metal can be supplied to the metal-air battery efficiently, and the metal-air battery can generate power steadily.

Preferably, the metal-air battery of the present invention further comprises a deliquoring mechanism, and the deliquoring mechanism separates the electrolytic solution from the precipitate including the electrolytic solution to form a deliquored product of the metallic compound.

According to this configuration, the metallic compound precipitate in the second electrolytic tank can be efficiently removed as the deliquored product.

Preferably, in the metal-air battery of the present invention, the deliquoring mechanism forms the deliquored product by pressing the precipitate.

According to this configuration, the metallic compound precipitate in the second electrolytic tank can be efficiently removed as the deliquored product.

Preferably, in the metal-air battery of the present invention, the deliquoring mechanism has a recovery unit for recovering the precipitate at a lower part of a region where the precipitate is formed.

According to this configuration, the precipitate formed can move to the recovery unit by subsiding.

Preferably, in the metal-air battery of the present invention, the deliquoring mechanism includes a deliquoring unit having a mold member and a first pressing member, the mold member and the first pressing member are disposed so as to press the precipitate including the electrolytic solution therebetween for forming the deliquored product, the second electrolytic tank has an opening in a bottom thereof, and the second electrolytic tank and the deliquoring unit are communicated with each other via the opening.

According to this configuration, the metallic compound precipitate accumulated in the second electrolytic tank can be moved to the deliquoring unit through the opening in the bottom of the second electrolytic tank, and the precipitate is pressed between the mold member and the first pressing member to form the deliquored product. Thus, the metallic compound precipitate accumulated in the second electrolytic tank can be formed into the deliquored product, and thereby the metallic compound can be efficiently removed from the metal-air battery as the deliquored product.

Preferably, in the metal-air battery of the present invention, the mold member or the first pressing member includes a first filter.

According to this configuration, the electrolytic solution can be separated from the metallic compound through the first filter and drained off when the metallic compound precipitate is pressed between the mold member and the first pressing member to form the deliquored product.

Preferably, in the metal-air battery of the present invention, the bottom of the second electrolytic tank is sloped downward to the opening as a lowermost part.

According to this configuration, the metallic compound precipitate accumulated in the second electrolytic tank can move to gather around the opening in the bottom, and therefore the metallic compound precipitate can be withdrawn from the second electrolytic tank efficiently.

Preferably, the metal-air battery of the present invention further comprises a pressing device constituting the deliquoring mechanism, the pressing device is configured so as to be inserted into the second electrolytic tank and to have a detachably-fixed second pressing member, and the second pressing member is configured so as to press the precipitate including the electrolytic solution against the bottom of the second electrolytic tank to form the deliquored product when the pressing device is inserted into the second electrolytic tank.

According to this configuration, the deliquored product of the metallic compound precipitate can be formed by inserting the pressing device into the second electrolytic tank. In addition, since the pressing device has the detachably-fixed second pressing member, the deliquored product can be efficiently formed and withdrawn by using the second pressing member.

Preferably, in the metal-air battery of the present invention, the second pressing member fits in the bottom of the second electrolytic tank.

According to this configuration, the deliquored product can be efficiently formed from the metallic compound precipitate.

Preferably, in the metal-air battery of the present invention, the second electrolytic tank has: an opening for draining the electrolytic solution while the precipitate including the electrolytic solution is being pressed between the second pressing member and the bottom of the second electrolytic tank; and a second filter provided to the opening.

According to this configuration, the electrolytic solution can be efficiently drained off when the deliquored product is formed from the metallic compound precipitate.

Preferably, in the metal-air battery of the present invention, the second electrolytic tank has a withdrawal outlet in the bottom thereof for withdrawing the deliquored product.

According to this configuration, the deliquored product can be efficiently removed from the second electrolytic tank when the deliquored product is formed by using the bottom of the second electrolytic tank.

Preferably, in the metal-air battery of the present invention, the second electrolytic tank has, in the bottom thereof, the second pressing member detached from the pressing device, and when a new pressing device to which a new second pressing member is fixed is inserted into the second electrolytic tank, the precipitate is pressed between the second pressing member detached and the new second pressing member fixed to the new pressing device to form the deliquored product.

According to this configuration, the deliquored product can be efficiently formed and withdrawn by using the second pressing member.

Preferably, in the metal-air battery of the present invention, the second electrolytic tank has an electrolytic tank unit replaceable with a new electrolytic tank unit, and when the new electrolytic tank unit is inserted into the second electrolytic tank, the precipitate is pressed between the bottom the second electrolytic tank and the new electrolytic tank unit to form the deliquored product.

According to this configuration, the deliquored product of the metallic compound can be formed during the replacement of the electrolytic tank unit, so that the deliquored product can be withdrawn from the electrolytic tank.

Preferably, in the metal-air battery of the present invention, the electrolytic tank unit fits in the bottom of the second electrolytic tank.

According to this configuration, the precipitate including the electrolytic solution can be pressed between the bottom of the second electrolytic tank and the new electrolytic tank unit to form the deliquored product.

Preferably, in the metal-air battery of the present invention, the metallic compound is a metallic oxide or a metallic hydroxide.

According to this configuration, the metallic compound can be precipitated to be the metallic compound precipitate.

Preferably, in the metal-air battery of the present invention, the metallic electrode includes at least one or more metals of Li, Mg, Al, Ca, Zn, Fe, Co, Cd and Pd.

According to this configuration, the metallic electrode can function as an anode.

Preferably, in the metal-air battery of the present invention, the metallic electrode is formed of metallic zinc, the electrolytic solution is an alkaline aqueous solution, and the metallic compound includes zinc oxide or zinc hydroxide.

According to this configuration, the metallic zinc emits electrons to chemically change into zinc oxide or zinc hydroxide, so that the discharge reaction in the metal-air battery can progress.

Preferably, in the metal-air battery of the present invention, the air electrode has a carbon support and a cathode catalyst supported on the carbon support.

According to this configuration, electrons supplied from the carbon support, oxygen gas supplied from the atmospheric air and water supplied from the atmospheric air or from the electrolytic solution can coexist in the cathode catalyst, from which hydroxide ions can be formed.

According to another aspect, the present invention provides an energy system for producing the metal which forms the metallic electrode through a reduction treatment of the deliquored product formed by the metal-air battery of the present invention and supplying the metal produced to the first electrolytic tank as the metallic electrode.

According to the energy system of the present invention, the metal which forms the metallic electrode can be utilized as an energy-storage/energy-carrying medium. Furthermore, by applying the metal-air battery of the present invention to the energy system of the present invention, maintenance costs of the energy system can be reduced. According to the metal-air battery of the present invention, the metallic compound precipitate can be removed while power is being supplied, and therefore the metallic compound precipitate can be removed more frequently. Thus, a substance cycle system of the energy system using the metal as an energy-storage/energy-carrying medium can be simplified. In addition, the velocity of the metallic compound recovery can be increased, and therefore the velocity of the circulation in the substance cycle can be improved.

Hereinafter, an embodiment of the present invention will be described with reference to the drawings. Configurations shown in the drawings or the following descriptions are just exemplifications and the scope of the present invention is not limited thereto.

Configuration of Metal-Air Battery

Figure 4:
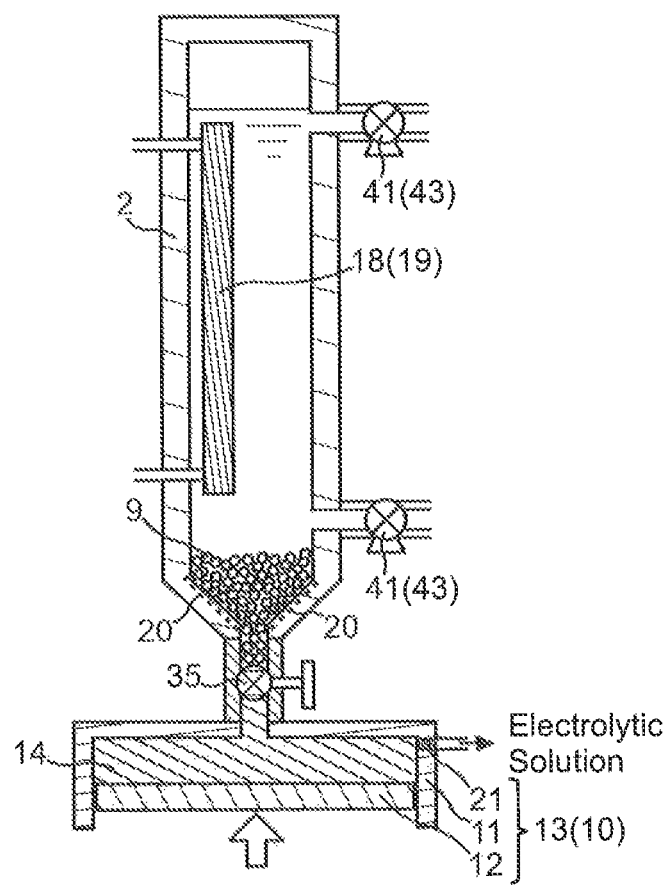
FIG. 4 is a schematic cross sectional view illustrating a second electrolytic tank and a deliquoring unit included in the metal-air battery of the embodiment of the present invention.
Figure 5:
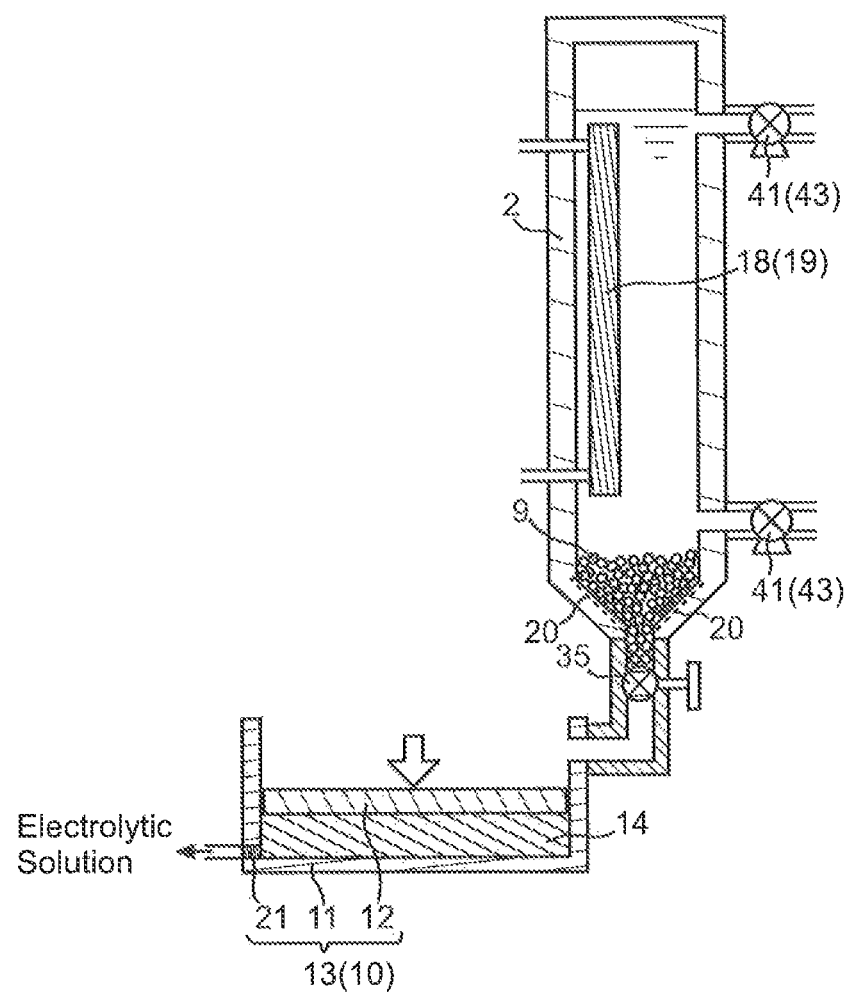
FIG. 5 is a schematic cross sectional view illustrating a second electrolytic tank and a deliquoring unit included in the metal-air battery of the embodiment of the present invention.

FIGS. 1 to 3, 6 and 8 are schematic cross sectional views each illustrating a configuration of a metal-air battery of the present embodiment. FIGS. 4 and 5 are schematic cross sectional views each illustrating a second electrolytic tank and a deliquoring unit included in the metal-air battery of the present embodiment.

A metal-air battery 45 of the present embodiment comprises: first and second electrolytic tanks 1 and 2 for storing an electrolytic solution 3; a metallic electrode 5 to serve as an anode provided in the first electrolytic tank 1; and an air electrode 6 to serve as a cathode, wherein the metallic electrode 5 is formed of a metal which becomes a metallic ion or composes a metallic compound in the electrolytic solution with progress of a battery reaction, the first and second electrolytic tanks 1 and 2 are communicated with each other for allowing the electrolytic solution 3 in the first electrolytic tank 1 to move into the second electrolytic tank 2, and the metallic ion or the metallic compound in the electrolytic solution 3 is precipitated as a metallic compound precipitate in the second electrolytic tank 2.

Hereinafter, the metal-air battery 45 of the present embodiment will be described.

1. Metal-Air Battery

The metal-air battery 45 of the present embodiment includes the metallic electrode 5 as a negative electrode (anode) and the air electrode 6 as a positive electrode (cathode). Examples thereof include zinc-air batteries, lithium-air batteries, sodium-air batteries, calcium-air batteries, magnesium-air batteries, aluminum-air batteries and iron-air batteries. In the metal-air battery 45 of the present embodiment, the metallic electrode 5 may be formed of cobalt, cadmium or palladium. Preferably, the metal-air battery 45 of the present embodiment is a primary battery, while it may be a primary battery or a secondary battery. When the metal-air battery 45 of the present embodiment is a primary battery, the metal which forms the metallic electrode 5 chemically changes into a metallic compound precipitate 9 in the electrolytic solution 3, and the metallic compound precipitate 9 needs to be removed from the electrolytic solution. In this case, therefore, the second electrolytic tank 2 in which the metallic compound precipitate 9 is formed can be utilized effectively.

2. First Electrolytic Tank, Second Electrolytic Tank, Electrolytic Solution

The first electrolytic tank 1 and the second electrolytic tank 2 are both for storing the electrolytic solution 3, and formed from a material having corrosion resistance against the electrolytic solution. The first and second electrolytic tanks 1 and 2 may be communicated with each other so that the electrolytic solution in the first electrolytic tank 1 flows into the second electrolytic tank 2 and the electrolytic solution in the second electrolytic tank 2 flows into the first electrolytic tank 1. According to this configuration, the metallic ion or the metallic compound in the electrolytic solution in the first electrolytic tank 1 can be moved into the second electrolytic tank 2 together with the electrolytic solution. The amount of the electrolytic solution in the first electrolytic tank 1 can be maintained by allowing the electrolytic solution after the formation of the metallic compound precipitate in the second electrolytic tank 2 to flow from the second electrolytic tank 2 into the first electrolytic tank 1.

Figure 2:
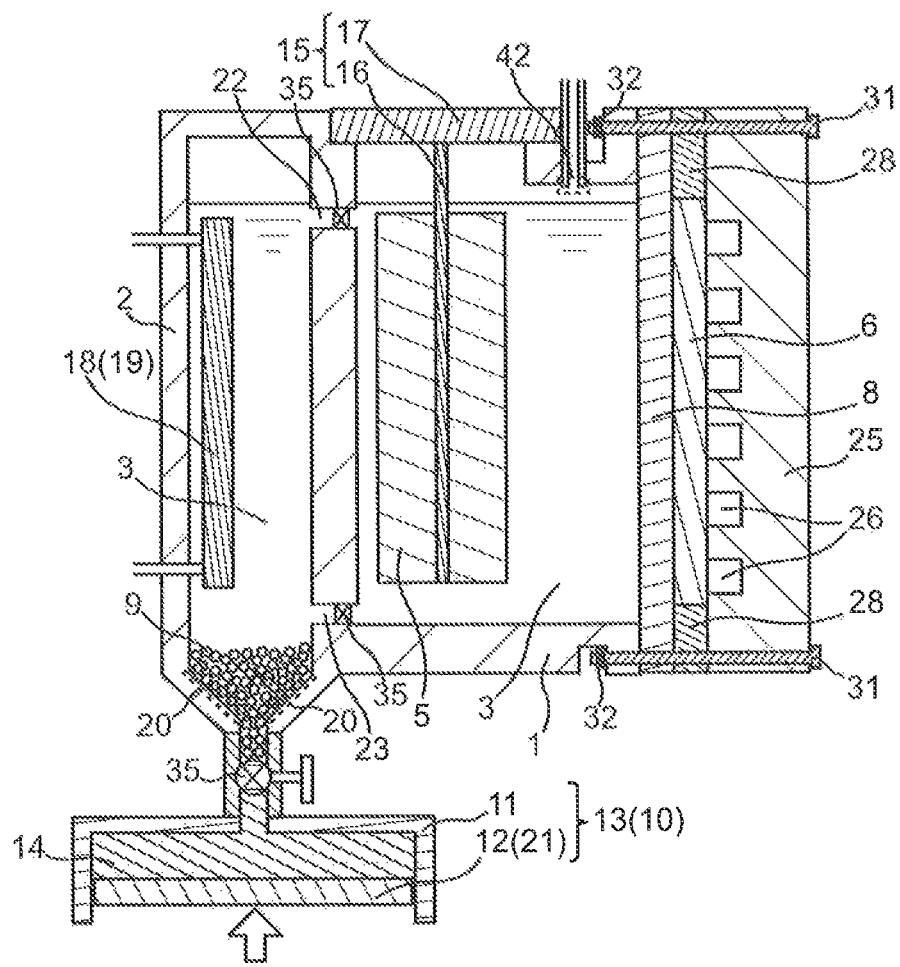
FIG. 2 is a schematic cross sectional view illustrating a configuration of the metal-air battery of the embodiment of the present invention.
Figure 3:
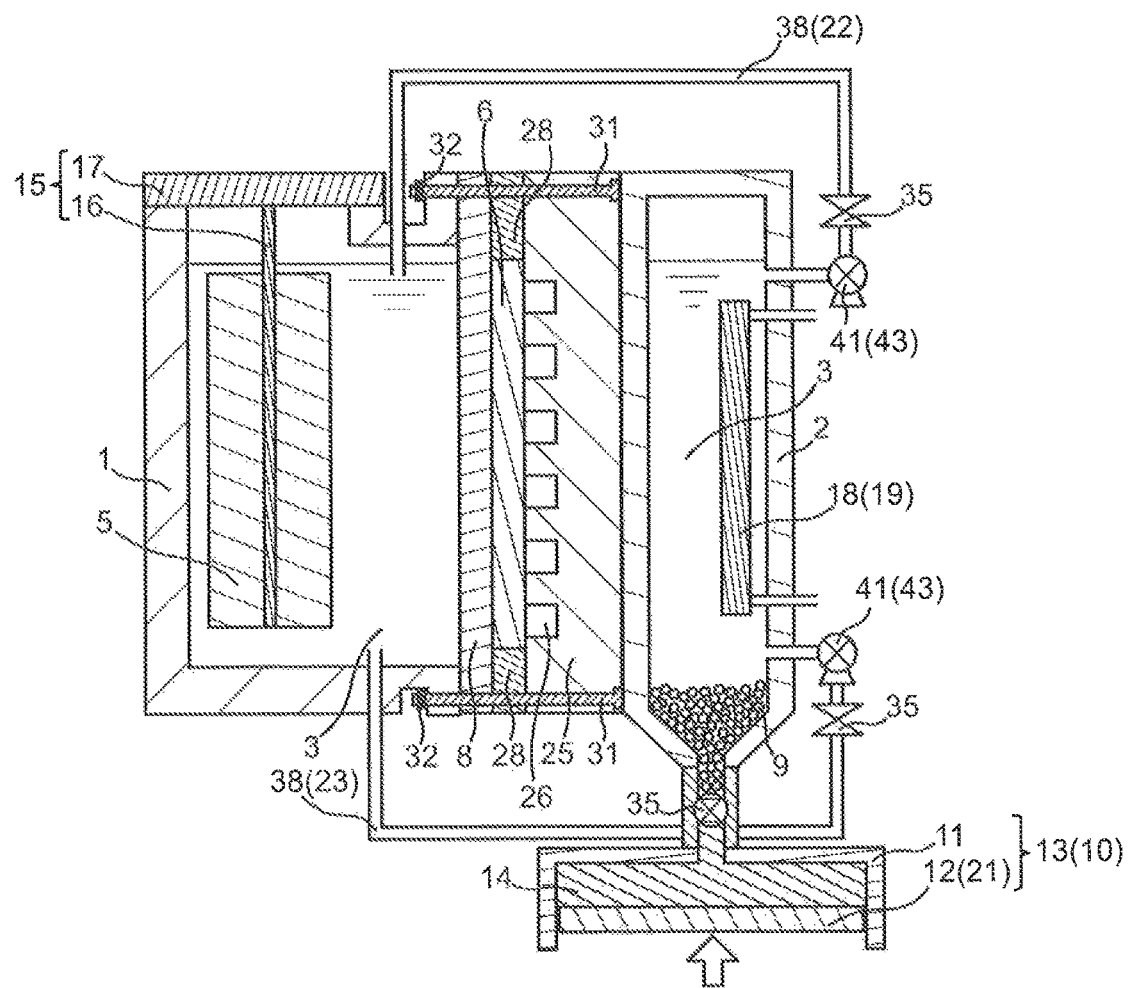
FIG. 3 is a schematic cross sectional view illustrating a configuration of the metal-air battery of the embodiment of the present invention.
Figure 6:
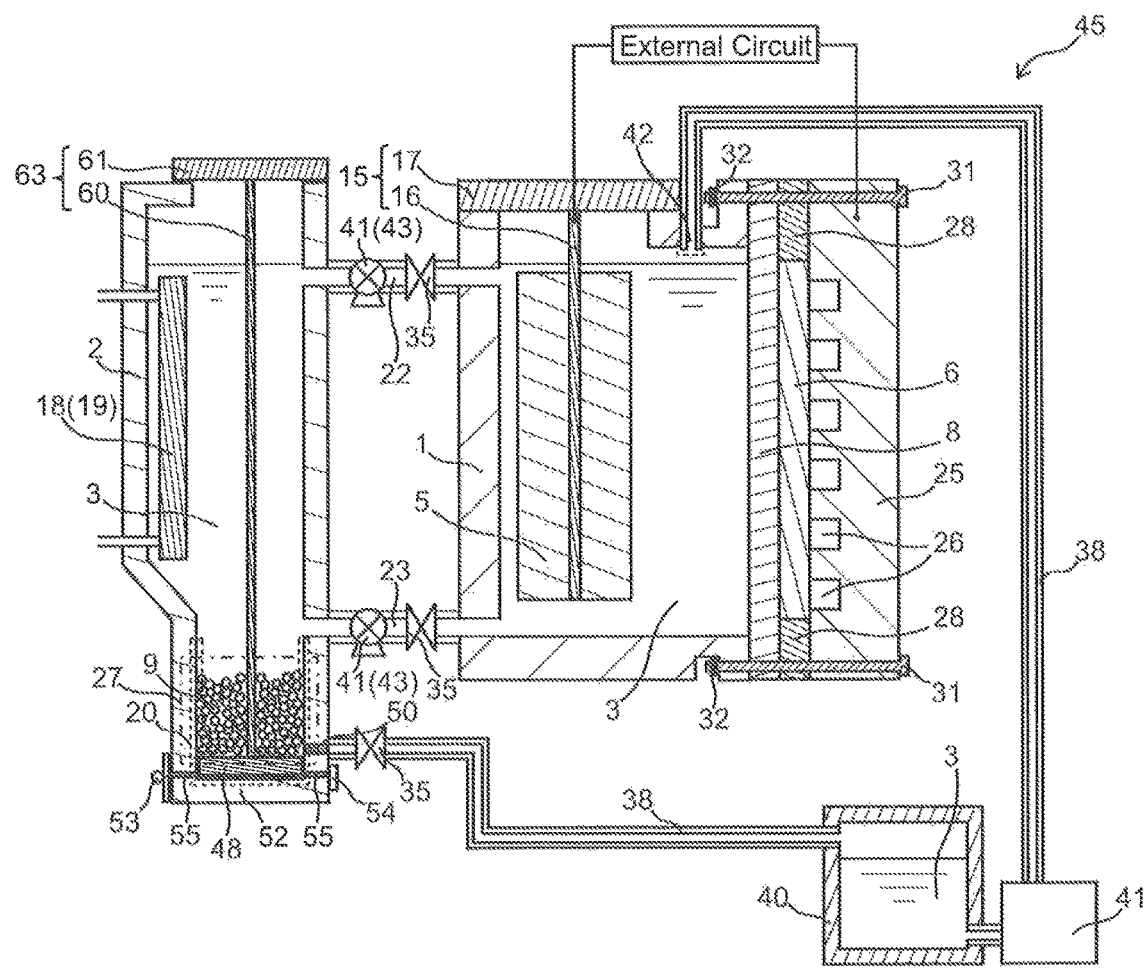
FIG. 6 is a schematic cross sectional view illustrating a configuration of the metal-air battery of the embodiment of the present invention.

For example, as illustrated in FIGS. 1, 3 and 6, the first and second electrolytic tanks 1 and 2 may be provided as independent tanks and communicated with each other by a pipe through which the electrolytic solution is guided, or as illustrated in FIG. 2, the first and second electrolytic tanks 1 and 2 are partitioned by a partition wall and communicated with each other by an opening provided in the partition wall.

In addition, as illustrated in FIGS. 1, 3 and 6, for example, the flow of the electrolytic solution may be generated by a drive unit 43 such as a pump 41. With the drive unit 43, it is possible to efficiently precipitate the metallic ion or the metallic compound in the electrolytic solution in the second electrolytic tank 2. However, the drive unit 43 may be omitted as illustrated in FIG. 2, for example. In this case, the flow of the electrolytic solution can be formed by the convection in the electrolytic solution generated by the heat of the battery reaction.

The first electrolytic tank 1 and the second electrolytic tank 2 can be communicated by a first passage 22 and a second passage 23, for example. According to this configuration, the electrolytic solution in the first electrolytic tank 1 can flow into the second electrolytic tank 2 through one of the first passage 22 and the second passage 23, and the electrolytic solution in the second electrolytic tank 2 can flow into the first electrolytic tank 1 through the other. A plurality of first passages 22 and a plurality of second passages 23 may be provided. As illustrated in FIGS. 1 to 3 and 6, for example, one of the first passage 22 and the second passage 23 may be provided near the surface of the electrolytic solution, and the other may be provided near the bottoms of the electrolytic tanks. According to this configuration, the metallic ion or the metallic compound in the electrolytic solution in the first electrolytic tank 1 can be efficiently moved to the second electrolytic tank 2 together with the electrolytic solution. The electrolytic solution in the first electrolytic tank 1 may flow into the second electrolytic tank 2 through the passage provided near the bottoms of the electrolytic tanks. According to this configuration, even when the metallic compound precipitate 9 is formed in the first electrolytic tank 1, the metallic compound precipitate 9 can be moved to the second electrolytic tank 2 through this passage.

Alternatively, both the first passage 22 and the second passage 23 may be provided near the surface of the electrolytic solution. According to this configuration, the electrolytic solution in the first electrolytic tank 1 can be prevented from being drained off even when the electrolytic solution in the second electrolytic tank 2 is drained off in order to remove the metallic compound precipitate 9. In this case, one of the first passage 22 and the second passage 23 may be configured so that its openings are located near the bottom of the first electrolytic tank 1 and near the bottom of the second electrolytic tank 2. According to this configuration, the electrolytic solution can be circulated efficiently.

The first passage 22 and the second passage 23 may each have a valve 35. According to this configuration, it is possible to drain off only the electrolytic solution in the second electrolytic tank 2 for removing the metallic compound precipitate 9 without draining off the electrolytic solution in the first electrolytic tank 1.

The first electrolytic tank 1 is configured to accommodate the metallic electrode 5. In addition, the first electrolytic tank 1 is configured to allow the ions in the air electrode 6 to move to the electrolytic solution 3 stored in the first electrolytic tank 1. This configuration allows ion conduction between the metallic electrode 5 and the air electrode 6 through the electrolytic solution 3 stored in the first electrolytic tank 1.

The second electrolytic tank 2 is provided so that the metallic ion or the metallic compound in the electrolytic solution is precipitated as the metallic compound precipitate in the second electrolytic tank 2. In addition, the second electrolytic tank 2 may constitute a deliquoring mechanism 10 to be described later.

Figure 8:
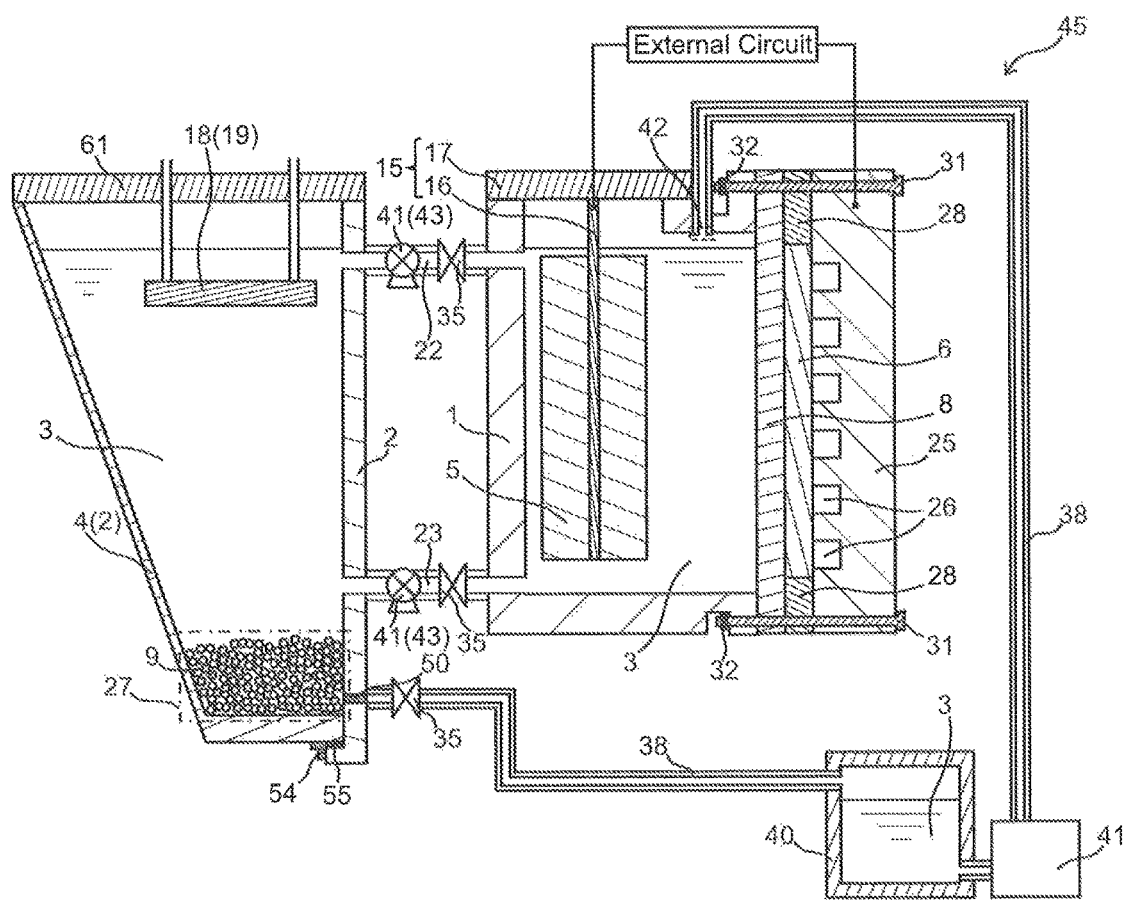
FIG. 8 is a schematic cross sectional view illustrating a configuration of the metal-air battery of the embodiment of the present invention.

Furthermore, the second electrolytic tank 2 may have a replaceable electrolytic tank unit 4 as in the case of the metal-air battery 45 illustrated in FIG. 8. The replaceable electrolytic tank unit 4 is fixed to the metal-air battery 45 in such a manner that it can be replaced with a new electrolytic tank unit 4.

How to form the metallic compound precipitate 9 in the second electrolytic tank 2 is not particularly limited. For example, the metallic compound precipitate 9 may be formed by cooling the electrolytic solution in the second electrolytic tank 2 or the metallic compound precipitate 9 may be formed by concentrating the electrolytic solution in the second electrolytic tank 2. Alternatively, the metallic compound precipitate 9 may be formed by adjusting the pH of the electrolytic solution in the second electrolytic tank 2 or the metallic compound precipitate 9 may be formed by adding an additive to the electrolytic solution.

For example, as illustrated in FIGS. 1 to 3 and 6, the second electrolytic tank 2 may be provided with a cooling unit 18. By cooling the electrolytic solution with the cooling unit 18, the saturation solubility of the metallic compound dissolved in the electrolytic solution can be reduced, and thereby the metallic compound precipitate 9 can be formed in the second electrolytic tank 2.

As the discharge reaction in the metal-air battery 45 progresses, an electrode reaction progresses in the air electrode 6 and in the metallic electrode 5 to generate heat. This heat of the reaction raises the temperature of the electrolytic solution in the first electrolytic tank 1. As a result, the saturation solubility of the metallic compound in the electrolytic solution in the first electrolytic tank 1 is increased. The metallic compound dissolved in the electrolytic solution will be precipitated in the electrolytic solution as the precipitate 9 when the electrolytic solution heated is caused to flow into the second electrolytic tank 2 and cooled by the cooling unit 18. By removing the metallic compound precipitate 9 from the second electrolytic tank 2, the metallic compound can be removed from the metal-air battery 45. The metallic compound precipitate 9 may be removed from the second electrolytic tank 2 by means of the deliquoring mechanism 10 to be described later or by centrifugation or filtration after draining off the metallic compound precipitate 9 together with the electrolytic solution.

The cooling unit 18 may be a water-cooling unit such as a coolant passage, an air-cooling unit having a structure which can easily dissipate heat into the air or another cooling unit with a heat carrier other than water. By providing the cooling unit 18 to the second electrolytic tank 2 and causing the electrolytic solution cooled in the second electrolytic tank 2 to flow into the first electrolytic tank 1, it is possible to prevent the temperature of the electrolytic solution in the first electrolytic tank 1 from being raised too much by the heat of the reaction. According to this configuration, the rate of progress of the electrode reaction in the metallic electrode 5 can be stabilized, and the metal-air battery 45 can output power steadily.

In the case where the second electrolytic tank 2 is provided with the cooling unit 18, one of the first passage 22 and the second passage 23 may be provided near the surface of the electrolytic solution and the other may be provided near the bottoms of the electrolytic tanks so that the electrolytic solution in the first electrolytic tank 1 flows into the second electrolytic tank 2 through the passage near the bottoms the electrolytic tanks and the electrolytic solution in the second electrolytic tank 2 flows into the first electrolytic tank 1 through the passage near the surface of the electrolytic solution. According to this configuration, the electrolytic solution cooled by the cooling unit 18 can be supplied to the vicinity of the surface of the electrolytic solution in the first electrolytic tank 1, and therefore temperature variation in the electrolytic solution in the first electrolytic tank 1 can be prevented. As a result, temperature variation in the metallic electrode 5 can be prevented and an upper part and a lower part of the metallic electrode 5 can have substantially the same rate of progress of the electrode reaction, preventing consumption rate variation in the metallic electrode 5.

In addition, the cooling unit 18 may be a heat absorption section of a heat recovery system. For example, the cooling unit may serve as a channel for water or a heat carrier, and the water or the heat carrier which has absorbed the heat of the electrolytic solution in the cooling unit 18 may be used to generate power or may be used as hot water. According to this configuration, the heat of the battery reaction in the metal-air battery 45 can be utilized for power generation or for hot water, and therefore the energy utilization efficiency can be increased.

In the case where the second electrolytic tank 2 is provided with the cooling unit 18, the second electrolytic tank 2 may be provided so that the electrolytic solution in the second electrolytic tank 2 absorbs the heat of a current collector 25 as illustrated in FIG. 3. According to this configuration, the heat generated by the electrode reaction in the air electrode 6 can be absorbed by the electrolytic solution in the second electrolytic tank 2, and such an electrolytic solution can be cooled by the cooling unit 18. Thus, the air electrode 6 can be cooled efficiently.

In the case where the metallic compound precipitate 9 is formed by concentrating the electrolytic solution in the second electrolytic tank 2, the second electrolytic tank 2 may have an electrolytic solution concentration mechanism. For example, the electrolytic solution concentration mechanism may concentrate the electrolytic solution in the second electrolytic tank 2 by providing a gas passage to the second electrolytic tank 2 and vaporizing the solvent of the electrolytic solution into the gas flowing through the gas passage or the mechanism may concentrate the electrolytic solution by providing a film having high solvent permeability in the second electrolytic tank 2.

When the second electrolytic tank 2 includes such an electrolytic solution concentration mechanism, the concentration of the metallic compound dissolved in the electrolytic solution in the second electrolytic tank 2 can be increased. By increasing this concentration higher than the saturation solubility, the metallic compound can be precipitated in the second electrolytic tank 2.

The electrolytic solution 3 is a solution having ionic conductivity obtained by dissolving an electrolyte in a solvent. The electrolytic solution 3 may be the one including an aqueous solvent (aqueous electrolytic solution) or the one including an organic solvent (organic electrolytic solution), although it depends on the kind of the metal for forming the metallic electrode 5.

For example, alkaline aqueous solutions such as a sodium hydroxide aqueous solution and a potassium hydroxide aqueous solution can be used for the electrolytic solution in the cases of zinc-air batteries, aluminum-air batteries and iron-air batteries, and a sodium chloride aqueous solution can be used for the electrolytic solution in the case of magnesium-air batteries. In the cases of lithium-air batteries, sodium-air batteries and calcium-air batteries, an organic electrolytic solution can be used.

Furthermore, the first electrolytic tank 1 may have a partition wall formed from a solid electrolyte, and an aqueous electrolytic solution may be stored in one chamber separated by the partition wall and an organic electrolytic solution may be stored in the other chamber.

3. Metallic Electrode, Metallic Compound, Metal Holder

The metallic electrode 5 is formed of a metal which emits electrons to become a metallic ion or compose a metallic compound in the electrolytic solution with progress of the discharge reaction in the battery. The metallic ion or the metallic compound in the electrolytic solution is precipitated as the metallic compound precipitate 9 (fine particles 9, acicular particles, platy particles, or the like) in the second electrolytic tank 2. For example, in the case of a zinc-air battery, the metallic electrode 5 is formed of metallic zinc, and the metallic compound is zinc oxide or zinc hydroxide. In the case of an aluminum-air battery, the metallic electrode 5 is formed of metallic aluminum, and the metallic compound is aluminum hydroxide. In the case of an iron-air battery, the metallic electrode 5 is formed of metallic iron, and the metallic compound is iron hydroxide oxide or iron oxide. In the case of a magnesium-air battery, the metallic electrode 5 is formed of metallic magnesium, and the metallic compound is magnesium hydroxide.

Likewise, in the cases of a lithium-air battery, a sodium-air battery and a calcium-air battery, the metallic electrode 5 is formed of metallic lithium, metallic sodium and metal calcium, respectively, and the metallic compound is oxide or hydroxide of these metals.

The metallic electrode 5 and the metallic compound are not limited to these examples and may be any for forming metal-air batteries. In addition, the metallic electrode 5 may be formed of an alloy, while metals each consisting of a single metallic element are mentioned as the examples for the metallic electrode 5.

The metallic electrode 5 can be fixed on a major surface of a support 16 of a metal holder 15. The shape of the support 16 is not limited as long as the metallic electrode 5 can be fixed thereon, and examples thereof include platy, tubular and spherical shapes. The support 16 may be formed of a metallic plate having corrosion resistance against the electrolytic solution. According to this configuration, the current can be collected from the metallic electrode 5 via the support 16 and the metallic electrode 5 can be connected to an external circuit. The metallic electrode 5 may be fixed on the major surface of the support 16 by pressing metallic particles or a piece of metal against the surface of the support 16 or by depositing a solid metal on the support 16 by plating.

The metal holder 15 is configured so that the metallic electrode 5 and the support 16 can be inserted into the first electrolytic tank 1. According to this configuration, the metallic electrode 5 can be disposed in the first electrolytic tank 1. When the amount of the metallic electrode 5 is reduced as the metal forming the metallic electrode 5 is consumed by the discharge reaction wherein the metal becomes the metallic ion or composes the metallic compound in the electrolytic solution, the amount of the metallic electrode 5 in the first electrolytic tank 1 can be maintained by replacing the metal holder 15 in the first electrolytic tank 1 with a new metal holder 15 holding a new metallic electrode 5. According to this configuration, the metal-air battery 45 can output power to the external circuit steadily.

The metal holder 15 may have a lid member 17 for fixation to the first electrolytic tank 1. For example, the metal holder 15 can have the lid member 17 as in the case of the metal holder 15 included in the metal-air battery 45 illustrated in FIGS. 1 to 3 and 6. Such a lid member 17 facilitates attachment of the metal holder 15 to the metal-air battery 45 and detachment of the metal holder 15 from the metal-air battery 45. The lid member 17 may be a lid for hermetically closing an opening of the first electrolytic tank 1 through which the metal holder 15 is inserted. According to this configuration, the electrolytic solution 3 can be prevented from reacting with atmospheric components. For example, when an alkaline electrolytic solution is used as the electrolytic solution, it is possible to prevent atmospheric carbon dioxide gas from dissolving in the electrolytic solution and neutralizing the alkaline electrolytic solution.

The lid member 17 may have a terminal for connecting the metallic electrode 5 and the external circuit. Connecting the terminal to the external circuit enables output of power from the metal-air battery 45.

4. Air Electrode, Ion Exchange Membrane

The air electrode 6 generates hydroxide ions ($OH^-$) from atmospheric oxygen gas, water and electrons. The air electrode 6 is composed of a conductive porous support and a cathode catalyst supported on the porous support, for example. According to this configuration, oxygen gas, water and electrons can coexist on the cathode catalyst, so that the electrode reaction can progress. The water to be used in the electrode reaction may be supplied from the atmospheric air or may be supplied from the electrolytic solution.

Examples of the porous support include carbon black such as acetylene black, furnace black, channel black and ketjen black; and conductive carbon particles such as graphite and activated carbon. In addition, carbon fiber such as vapor-grown carbon fiber (VGCF), carbon nanotube and carbon nanowire may be used.

Examples of the cathode catalyst include fine particles of a metal such as platinum, iron, cobalt, nickel, palladium, silver, ruthenium, iridium, molybdenum and manganese; of a compound of the metal; and of an alloy containing two or more kinds of these metals. Preferably, the alloy contains at least two or more kinds of platinum, iron, cobalt and nickel. Examples thereof include platinum-iron alloys, platinum-cobalt alloys, iron-cobalt alloys, cobalt-nickel alloys, iron-nickel alloys and iron-cobalt-nickel alloys.

A surface of the porous support included in the air electrode 6 may be treated so that a cation group can exist as a fixed ion on the surface. According to this configuration, the hydroxide ions can be conducted on the surface of the porous support, and therefore the hydroxide ions generated on the cathode catalyst can easily move.

The air electrode 6 may have anion exchange resin supported on a porous support. According to this configuration, the hydroxide ions can be conducted on the anion exchange resin, and therefore the hydroxide ions generated on the cathode catalyst can easily move.

The air electrode 6 may be disposed so as to be in direct contact with the atmospheric air or to be in contact with airflow paths 26. According to this configuration, oxygen gas can be supplied to the air electrode 6. In the case where the airflow paths 26 are provided, water as well as oxygen gas can be supplied to the air electrode 6 by sending humidified air to the airflow paths 26. The airflow paths 26 can be provided to the current collector 25 included in the metal-air battery 45 as illustrated in FIGS. 1 to 3 and 6, for example. According to this configuration, the airflow paths 26 can be formed and the air electrode 6 can be connected to the external circuit via the current collector 25, and therefore the power from the metal-air battery 45 can be output to the external circuit.

The current collector 25 may be disposed so as to be in contact with the second electrolytic tank 2 as illustrated in FIG. 3.

The air electrode 6 may be disposed so as to be in contact with the electrolytic solution 3 stored in the first electrolytic tank 1. According to this configuration, the hydroxide ions generated in the air electrode 6 can easily move to the electrolytic solution 3. In addition, water needed for the electrode reaction in the air electrode 6 can be easily supplied from the electrolytic solution 3 to the air electrode 6.

The air electrode 6 may be disposed so as to be in contact with an ion exchange membrane 8 in contact with the electrolytic solution 3 stored in the first electrolytic tank 1. The ion exchange membrane 8 may be an anion exchange membrane. According to this configuration, the hydroxide ions generated in the air electrode 6 can be conducted through the anion exchange membrane to move to the electrolytic solution.

With the ion exchange membrane 8, the ion species that can move between the air electrode 6 and the electrolytic solution 3 can be limited. In the case where the ion exchange membrane 8 is an anion exchange membrane, the anion exchange membrane has a cation group as a fixed ion, and therefore cations in the electrolytic solution cannot be conducted to the air electrode 6. On the other hand, the hydroxide ions generated in the air electrode 6 are anions and therefore can be conducted to the electrolytic solution. According to this configuration, the battery reaction in the metal-air battery 45 can progress, and the cations in the electrolytic solution 3 can be prevented from moving to the air electrode 6. Thus, precipitation of a metal and carbonate in the air electrode 6 can be prevented.

In addition, with the ion exchange membrane 8, excessive supply of water contained in the electrolytic solution to the air electrode 6 can be prevented.

Examples of the ion exchange membrane 8 include solid polymer electrolyte membranes (anion exchange membranes) based on perflourosulfonic acid, perfluorocarboxylic acid, styrene divinyl benzene and quaternary ammonium.

In the case where the air electrode 6 is disposed so as to be in contact with the ion exchange membrane 8, the air electrode 6 can be formed on the ion exchange membrane 8, which is then disposed between the first electrolytic tank 1 and the current collector 25 as illustrated in FIGS. 1 to 3 and 6, for example.

5. Deliquoring Mechanism, Electrolytic Solution Circulation Mechanism

The deliquoring mechanism 10 separates and drains the electrolytic solution from the metallic compound precipitate 9 formed in the second electrolytic tank 2 to form a deliquored product 14 of the metallic compound. The method for separating and draining the electrolytic solution from the metallic compound precipitate 9 including the electrolytic solution is not particularly limited, and examples thereof include a method by pressing the precipitate 9 including the electrolytic solution, a method by filtering the precipitate 9 including the electrolytic solution, a method by decompressing the precipitate 9 including the electrolytic solution and a method by heating the precipitate 9 including the electrolytic solution. In particular, the method by pressing the precipitate 9 including the electrolytic solution is preferable. According to this method, the electrolytic solution can be readily separated and drained from the precipitate 9 including the electrolytic solution to give the deliquored product 14.

When the metal-air battery 45 includes the deliquoring mechanism 10, the metallic compound precipitate 9 in the electrolytic solution can be efficiently removed as the deliquored product 14. Here, will be described the case where the deliquored product 14 is formed from the metallic compound precipitate 9 in the form of fine particles, but the form of the metallic compound precipitate 9 is not limited and may be platy or acicular particles, for example.

The deliquored product 14 refers to a solidified metallic compound from which the electrolytic solution included therein has been removed.

The deliquoring mechanism 10 may be provided with a recovery unit 27 for recovering the precipitate 9 at a lower part of a region where the precipitate 9 is formed. According to this configuration, the precipitate 9 formed can move to the recovery unit by subsiding. In addition, the precipitate 9 subsiding generates convection to accelerate the circulation of the electrolytic solution between the first electrolytic tank 1 and the second electrolytic tank 2. The recovery unit 17 can be disposed as illustrated in FIGS. 1, 6 and 8, for example.

The form of the deliquoring mechanism 10 is not particularly limited, and it may perform the deliquoring of the metallic compound fine particles 9 to form the deliquored product 14 outside the second electrolytic tank 2 or may perform the deliquoring of the metallic compound fine particles 9 to form the deliquored product 14 inside the second electrolytic tank 2. When the second electrolytic tank 2 has the replaceable electrolytic tank unit 4, the deliquoring mechanism 10 may be in a form in which the deliquored product 14 is formed by insertion of a new electrolytic tank unit 4 into the second electrolytic tank 2.

First, will be described the mechanism which performs the deliquoring of the metallic compound fine particles 9 to form the deliquored product 14 outside the second electrolytic tank 2. In this case, the metal-air battery 45 can include a deliquoring unit 13 having a mold member 11 and a first pressing member 12 as illustrated in FIGS. 1 to 5, for example.

The mold member 11 and the first pressing member 12 can be provided so as to form the deliquored product 14 by pressing the metallic compound fine particles 9 including the electrolytic solution therebetween. For example, as illustrated in FIGS. 1 to 5, the first pressing member 12 can be configured to fit in an opening of the mold member 11. According to this configuration, the metallic compound fine particles 9 including the electrolytic solution are introduced between the mold member 11 and the first pressing member 12, and the mold member 11 and the first pressing member 12 press the metallic compound fine particles 9 therebetween, so that the electrolytic solution is drained off and the deliquored product 14 of the metallic compound can be formed.

The mold member 11 and the first pressing member 12 may have a play therebetween (clearance for preventing the mold member 11 and the first pressing member 12 from being in close contact and allowing a certain degree of movement therebetween).

In addition, the mold member 11 or the first pressing member 12 can be provided with a first filter 21. According to this configuration, the electrolytic solution can be separated and drained from the metallic compound fine particles 9 through the first filter 21 while the metallic compound fine particles 9 are being pressed between the mold member 11 and the first pressing member 12.

The first filter 21 may be provided to the first pressing member 12 as illustrated in FIGS. 1 to 3, for example. In this case, the first pressing member 12 may be formed of a material to serve as a filter, or the first pressing member 12 may be formed of a porous material and have a filter film on an surface thereof that contacts with the metallic compound fine particles 9, or the first pressing member 12 may be provided with an opening and the first filter 21 may be provided to the opening.

The first filter 21 can be provided to the mold member 11 as illustrated in FIGS. 4 and 5, for example. In this case, (a part of) the mold member 11 may be formed of a material to serve as a filter, or (a part of) the mold member 11 may be formed of a porous material and have a filter film on an surface thereof that contacts with the metallic compound fine particles 9, or the mold member 11 may be provided with an opening and the first filter 21 may be provided to the opening. In addition, a porous material may be used for the material of the mold member 11. According to this configuration, the deliquoring effect can be enhanced. For example, gypsum can be used for the material of the mold member 11.

The second electrolytic tank 2 may have an opening in a bottom 20, and the second electrolytic tank 2 and the deliquoring unit 13 may be communicated via the opening. According to this configuration, the metallic compound fine particles 9 in the second electrolytic tank 2 can be moved to the deliquoring unit 13 together with the electrolytic solution. The second electrolytic tank 2 and the deliquoring unit 13 may be communicated so as to allow the metallic compound fine particles 9 in the second electrolytic tank 2 can flow into the space between the mold member 11 and the first pressing member 12 as illustrated in FIGS. 1 to 4. Alternatively, the second electrolytic tank 2 and the deliquoring unit 13 may be communicated so as to allow the metallic compound fine particles 9 in the second electrolytic tank 2 can flow into the mold member 11 together with the electrolytic solution as illustrated in FIG. 5.

A communication path for linking the second electrolytic tank 2 and the deliquoring unit 13 can include a valve 35. According to this configuration, the electrolytic solution can be prevented from leaking from the second electrolytic tank 2. Furthermore, the metallic compound fine particles 9 and the electrolytic solution can be prevented from flowing back to the second electrolytic tank 2 while the metallic compound fine particles 9 are being pressed to form the deliquored product 14.

The second electrolytic tank 2 can have the bottom 20 sloped downward to the opening for the communication with the deliquoring unit 13 as a lowermost part. According to this configuration, the metallic compound fine particles 9 accumulated on the bottom of the second electrolytic tank 2 can be gathered around the opening as the lowermost part, and the metallic compound fine particles 9 in the second electrolytic tank 2 can be moved to the deliquoring unit 13 efficiently. For example, the bottom 20 of the second electrolytic tank 2 can have the opening and can be configured to slope downward to the opening as the lowermost part as in the second electrolytic tank 2 included in the metal-air battery 45 illustrated in FIGS. 1 to 5.

Next, will be described the mechanism which performs the deliquoring of the metallic compound fine particles 9 to form the deliquored product 14 inside the second electrolytic tank 2. In this case, the metal-air battery 45 can have a pressing device 63.

The pressing device 63 can have a second pressing member 48 detachably fixed thereto. The second pressing member 48 is disposed so that the metallic compound fine particles 9 can be pressed between the second pressing member 48 and the bottom 20 of the second electrolytic tank 2 to form the deliquored product 14 when the pressing device 63 is inserted into the second electrolytic tank 2.

How to fix the second pressing member 48 to the pressing device 63 is not particularly limited, and the second pressing member 48 can be detachably fixed to a metallic plate 60 included in the pressing device 63 at one or more points, for example.

The second electrolytic tank 2 can have the bottom 20 in which the second pressing member 48 fits. When the second pressing member 48 fits in the bottom 20 of the second electrolytic tank 2, the metallic compound fine particles 9 can be pressed between the bottom 20 of the second electrolytic tank 2 and the second pressing member 48 to form the deliquored product 14. The bottom 20 of the second electrolytic tank 2 and the second pressing member 48 may have a play therebetween (clearance for preventing the bottom 20 and the second pressing member 48 from being in close contact and allowing a certain degree of movement therebetween).

The second electrolytic tank 2 can further have an opening through which the electrolytic solution is drained while the metallic compound fine particles 9 are being pressed between the second pressing member 48 and the bottom 20 of the second electrolytic tank 2, and a second filter 50 provided to the opening. According to this configuration, the electrolytic solution can be separated and drained from the metallic compound fine particles 9 through the second filter 50 for forming the deliquored product 14. The second filter 50 can be provided near the bottom of the second electrolytic tank 2 as illustrated in FIG. 6, for example.

The second electrolytic tank 2 can have a withdrawal outlet in the bottom thereof thorough which the deliquored product 14 of the metallic compound is withdrawn. Through the withdrawal outlet, the deliquored product 14 of the metallic compound can be withdrawn out of the second electrolytic tank 2. The form of the withdrawal outlet is not particularly limited as long as the deliquored product 14 can be withdrawn therethrough. For example, as illustrated in FIG. 6, the second electrolytic tank 2 may have an openable withdrawal door unit 52 in the bottom thereof, so that the deliquored product 14 can be withdrawn through the withdrawal outlet by opening the withdrawal door unit 52. In this case, a sealing member 55 can be provided in order to prevent leakage of the electrolytic solution.

Figure 7A:
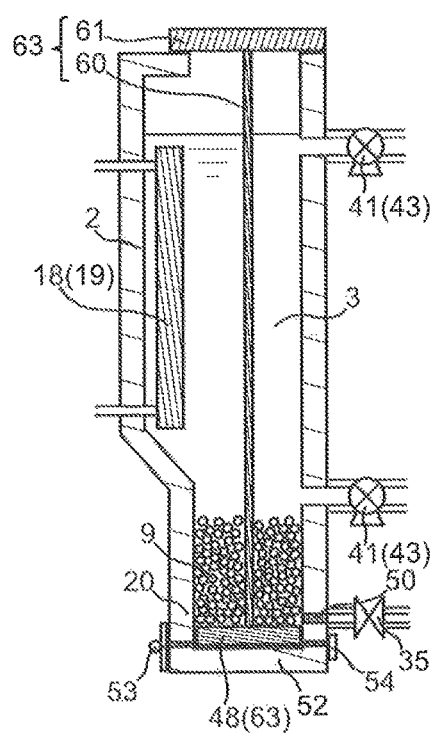
FIGS. 7A to 7D are explanatory diagrams of a deliquoring mechanism of the metal-air battery of the embodiment of the present invention.
Figure 7B:
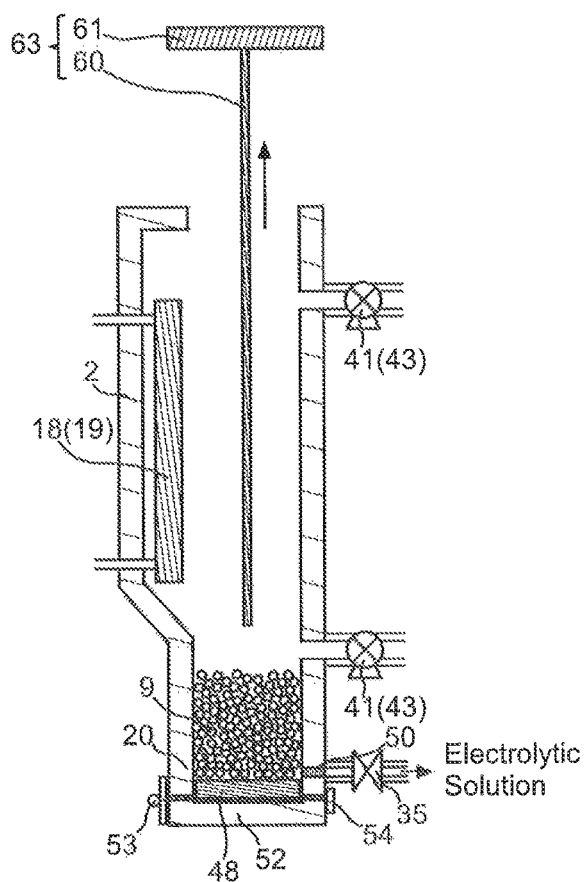

The deliquoring mechanism of the metal-air battery 45 illustrated in FIG. 6 will be described. FIGS. 7A to 7D are explanatory diagrams of the deliquoring mechanism of the metal-air battery 45. FIG. 7A is a schematic cross sectional view of the second electrolytic tank 2 when the metallic compound fine particles are formed in the second electrolytic tank 2 and accumulated on the bottom of the second electrolytic tank 2. Thereafter, the pressing device 63 is separated from the second pressing member 48 and pulled out of the second electrolytic tank 2 while the second pressing member 48 is being left on the bottom of the second electrolytic tank 2. Furthermore, by opening the valve 35, the electrolytic solution can be drained out of the second electrolytic tank 2 through the second filter 50 while the metallic compound fine particles 9 are being left on the bottom of the second electrolytic tank 2. FIG. 7B is a sectional view of the second electrolytic tank 2 in this state. In this state, the second electrolytic tank 2 has the second pressing member 48 on the bottom thereof, and the metallic compound fine particles 9 including the electrolytic solution are accumulated thereon.

Figure 7C:
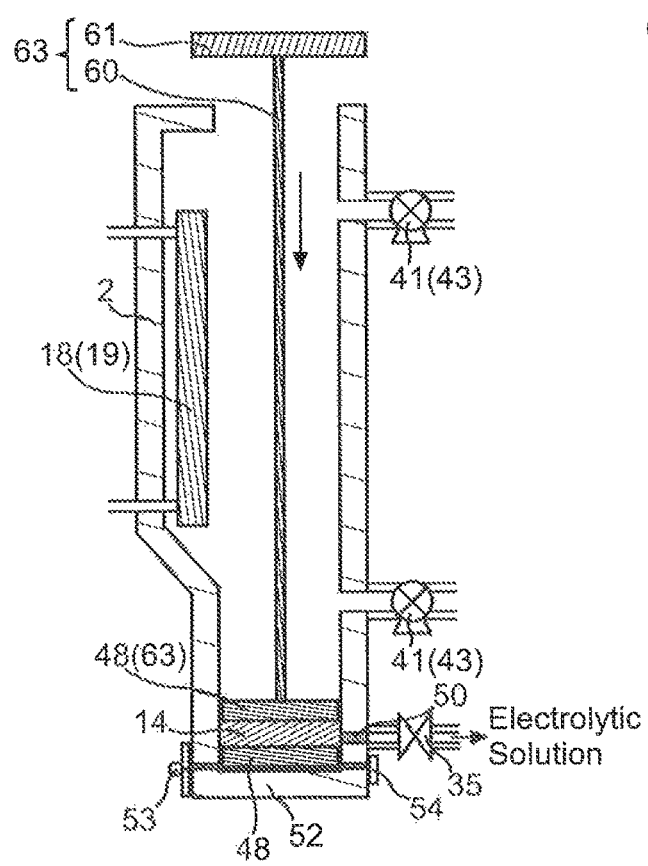

Thereafter, a new pressing device 63 to which a new second pressing member 48 has been fixed is inserted into the second electrolytic tank 2. At this time, the new second pressing member 48 fits in the bottom of the second electrolytic tank 2, and the second pressing member 48 left on the bottom of the second electrolytic tank 2 and the new second pressing member 48 fixed to the pressing device 63 will have the metallic compound fine particles 9 accumulated around the bottom of the second electrolytic tank 2 therebetween. By further pushing the pressing device 63, the metallic compound fine particles 9 are pressed between the two second pressing members 48, and the electrolytic solution included in the metallic compound fine particles 9 is drained out of the second electrolytic tank 2 through the second filter 50. The metallic compound fine particles 9 from which the electrolytic solution has been drained are molded to be the deliquored product 14. FIG. 7C is a sectional view of the second electrolytic tank 2 in this state.

Figure 7D:
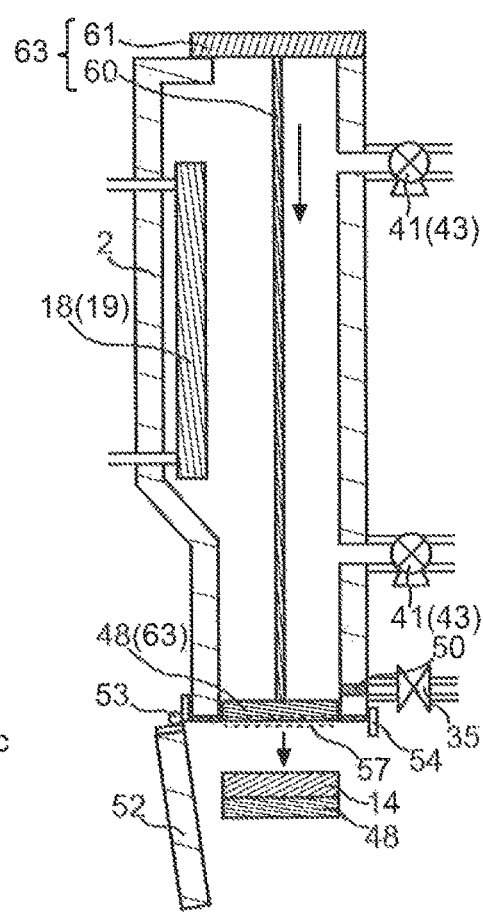

Thereafter, the withdrawal door unit 52 is opened, and the deliquored product 14 of the metallic compound is withdrawn through the withdrawal outlet together with the second pressing member 48. FIG. 7D is a sectional view of the second electrolytic tank 2 in this state. According to this configuration, the metallic compound fine particles 9 accumulated in the second electrolytic tank 2 can be removed from the second electrolytic tank 2 as the deliquored product 14.

Next, will be described the mechanism in the case where the second electrolytic tank 2 has the replaceable electrolytic tank unit 4 and the deliquored product 14 is formed by insertion of a new electrolytic tank unit 4 into the second electrolytic tank 2. In this case, the second electrolytic tank 2 has the replaceable electrolytic tank unit 4, and the replaceable electrolytic tank unit 4 is provided so as to be replaceable with a new electrolytic tank unit 4. By inserting the new electrolytic tank unit 4 into the second electrolytic tank 2, the metallic compound fine particles 9 including the electrolytic solution are pressed between the bottom of the second electrolytic tank 2 and the new electrolytic tank unit 4 to be the deliquored product 14.

The electrolytic tank unit 4 can be a member having portions to be respectively the bottom and a side wall of the second electrolytic tank 2 as illustrated in FIG. 8, for example. Furthermore, the electrolytic tank unit 4 can be configured so that the surface to serve as the bottom of the second electrolytic tank 2 and the lower surface of the electrolytic tank unit 4 have the same shape. According to this configuration, when two electrolytic tank units 4 having the same shape are stacked the upper electrolytic tank unit 4 can fit in the lower electrolytic tank unit 4. Thus, the metal oxide fine particles 9 can be pressed between the two electrolytic tank units 4 stacked one on top of the other to form the deliquored product 14. The above-described second filter 50 and the sealing member 55 can be provided also in this case.

Figure 9A:
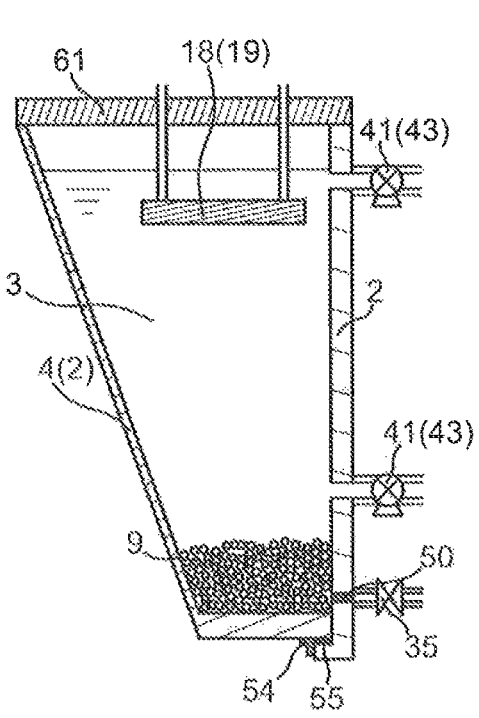
FIGS. 9A to 9D are explanatory diagrams of a deliquoring mechanism of the metal-air battery of the embodiment of the present invention.
Figure 9B:
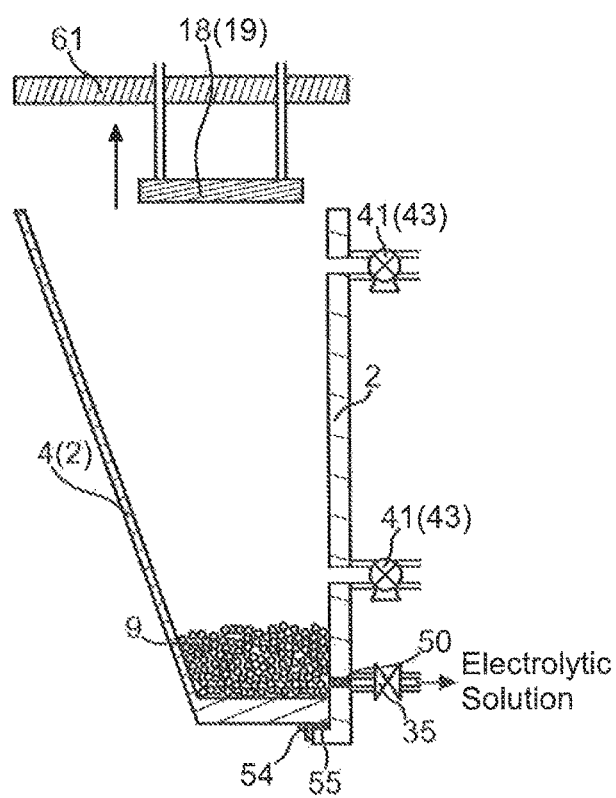

The deliquoring mechanism 10 of the metal-air battery 45 illustrated in FIG. 8 will be described. FIGS. 9A to 9D are explanatory diagrams of the deliquoring mechanism 10 of the metal-air battery 45. FIG. 9A is a schematic cross sectional view of the second electrolytic tank 2 when power is output from the metal-air battery 45 illustrated in FIG. 8 and the metal forming the metallic electrode 5 has been consumed. At this time, the metallic compound fine particles 9 are accumulated on the bottom of the second electrolytic tank 2. Thereafter, by removing a lid member 61 from the second electrolytic tank 2 and opening the valve 35, the electrolytic solution can be drained out of the second electrolytic tank 2 through the second filter 50 while the metallic compound fine particles 9 are being left on the bottom of the second electrolytic tank 2. FIG. 9B is a sectional view of the second electrolytic tank 2 in this state. At this time, the metallic compound fine particles 9 including the electrolytic solution are accumulated on the bottom of the electrolytic tank unit 4 included in the second electrolytic tank 2.

Figure 9C:
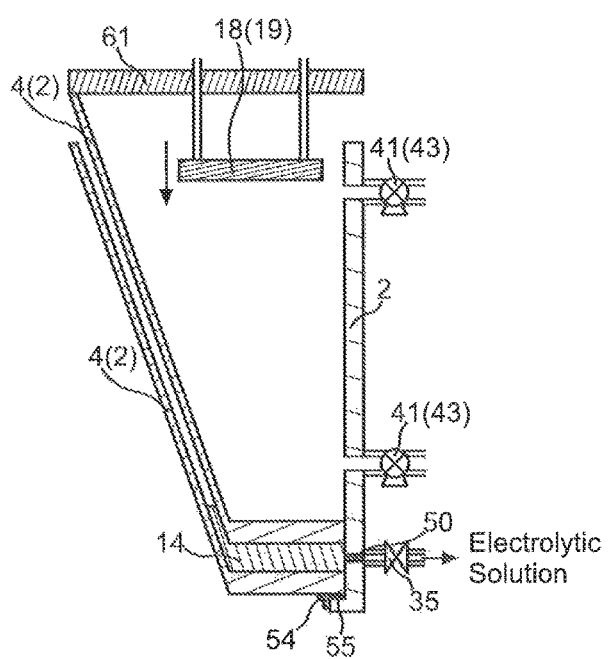

Thereafter, a new electrolytic tank unit 4 is inserted into the second electrolytic tank 2. At this time, the new electrolytic tank unit 4 fits in the bottom of the second electrolytic tank 2, and the bottom of the second electrolytic tank 2 and the new electrolytic tank unit 4 will have the metallic compound fine particles 9 accumulated on the bottom of the second electrolytic tank 2 therebetween. By further pushing the new electrolytic tank unit 4, the metallic compound fine particles 9 are pressed between the bottom of the second electrolytic tank 2 and the new electrolytic tank unit 4, and the electrolytic solution included in the metallic compound fine particles 9 is drained out of the second electrolytic tank 2 through the second filter 50. The metallic compound fine particles 9 from which the electrolytic solution has been drained are molded to be the deliquored product 14. FIG. 9C is a sectional view of the second electrolytic tank 2 in this state.

Figure 9D:
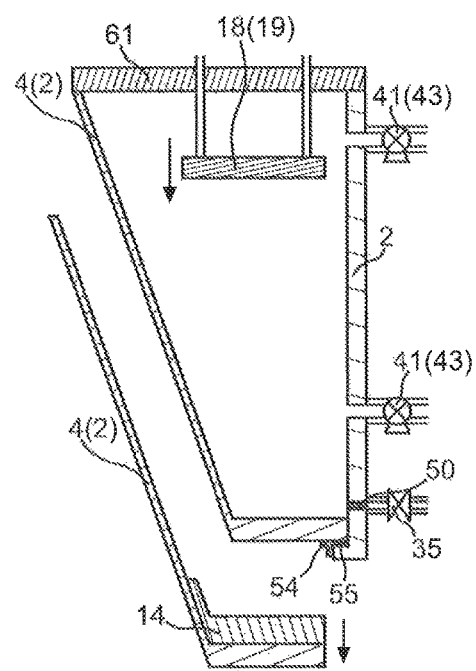
Figure 10:
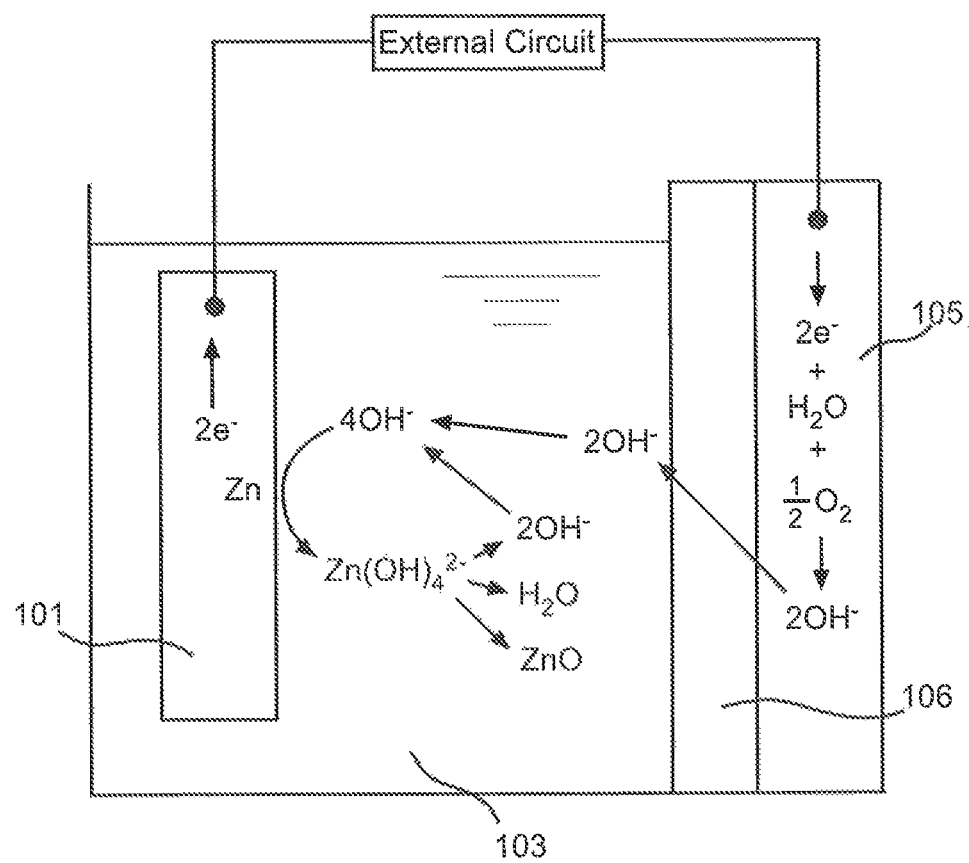
FIG. 10 is a schematic cross sectional view for illustrating a discharge reaction of a conventional zinc-air battery.

Thereafter, the electrolytic tank unit 4 fixed to the metal-air battery 45 is detached, and the new electrolytic tank unit 4 inserted in the second electrolytic tank 2 is attached to the metal-air battery 45. FIG. 9D is a sectional view of the second electrolytic tank 2 in this state. According to this configuration, the metallic compound fine particles 9 accumulated in the second electrolytic tank 2 can be removed from the second electrolytic tank 2 as the deliquored product 14 together with the detached electrolytic tank unit 4.

The metal-air battery 45 can have an electrolytic solution circulation mechanism. The electrolytic solution circulation mechanism supplies the electrolytic solution drained out of the second electrolytic tank 2 back to the second electrolytic tank 2. For example, as illustrated in FIGS. 1, 6 and 8, the mechanism includes an electrolytic tank 40 for storing the electrolytic solution drained out of the second electrolytic tank 2, supplies the electrolytic solution stored in the electrolytic tank 40 to the first electrolytic tank 1 by using a pump, and supplies the electrolytic solution in the first electrolytic tank 1 to the second electrolytic tank 2.

6. Energy System

The metal-air battery 45 of the present embodiment can constitute an energy system using the metal for forming the metallic electrode 5 as an energy-storage/energy-carrying medium. The energy system produces the metal for forming the metallic electrode 5 by giving a reduction treatment to the deliquored product 14 formed by the metal-air battery 45 of the present embodiment and supplies the metal to the first electrolytic tank 1 as the metallic electrode 5.

For example, the metal-air battery 45 can be provided in an urban region, and a reductor for the metallic compound can be provided in a large-scale solar-cell power plant. In the urban region, power is generated by the metal-air battery 45 for electric energy supply. During the power generation, the metallic compound generated due to the consumption of the metallic electrode 5 is recovered from the metal-air battery 45 of the present embodiment. The metallic compound recovered is carried to the reductor provided in the large-scale solar-cell power plant and given the reduction treatment with power generated at the solar-cell power plant to produce the metal. The metal produced is carried to the urban region to be supplied to the metal-air battery 45 as the metallic electrode 5, and power is generated by the metal-air battery 45.

According to such an energy system, power can be stored as a metal in a solar-cell power plant, and power can be generated by utilizing the metal in an urban region having high demand for power. By using the metal-air battery 45 of the present embodiment in such an energy system, the metallic compound fine particles can be removed while power is being supplied, and therefore the metallic compound fine particles can be removed more frequently. Accordingly, a substance cycle system of the energy system using the metal as an energy-storage/energy-carrying medium can be simplified. In addition, the velocity of the metallic compound recovery can be increased, and therefore the velocity of the circulation in the substance cycle can be improved.

What is claimed is:

1. A metal-air battery comprising: first and second electrolytic tanks for storing an electrolytic solution; a metallic electrode to serve as an anode, the metallic electrode provided in the first electrolytic tank; and an air electrode to serve as a cathode, wherein
   the metallic electrode is formed of a metal which becomes a metallic ion or composes a metallic compound in the electrolytic solution with progress of a battery reaction,
   the first and second electrolytic tanks are communicated with each other for allowing the electrolytic solution in the first electrolytic tank to move into the second electrolytic tank,
   the metallic ion or the metallic compound in the electrolytic solution is precipitated as a metallic compound precipitate in the second electrolytic tank, and
   the metal-air battery further includes a deliquoring mechanism that separates the electrolytic solution from the metallic compound precipitate including the electrolytic solution to form a deliquored product of the metallic compound.

2. The metal-air battery according to claim 1, wherein the first and second electrolytic tanks are communicated with each other so that the electrolytic solution in the first electrolytic tank flows into the second electrolytic tank and the electrolytic solution in the second electrolytic tank flows into the first electrolytic tank.

3. The metal-air battery according to claim 2, further comprising a drive unit for sending the electrolytic solution in such a manner that the electrolytic solution in the first electrolytic tank flows into the second electrolytic tank and the electrolytic solution in the second electrolytic tank flows into the first electrolytic tank.

4. The metal-air battery according to claim 1, wherein the second electrolytic tank comprises a cooling unit, and the cooling unit cools the electrolytic solution in the second electrolytic tank.

5. The metal-air battery according to claim 4, further comprising a heat recovery system, wherein the cooling unit is a heat absorption section of the heat recovery system.

6. The metal-air battery according to claim 4, further comprising a current collector in contact with the air electrode, wherein the second electrolytic tank is disposed so that the electrolytic solution in the second electrolytic tank absorbs heat of the current collector.

7. The metal-air battery according to claim 1, wherein the second electrolytic tank comprises an electrolytic solution concentration mechanism.

8. The metal-air battery according to claim 1, further comprising an ion exchange membrane having first and second major surfaces, wherein the ion exchange membrane is disposed so that the first major surface is in contact with the electrolytic solution stored in the first electrolytic tank and the second major surface opposing the first major surface is in contact with the air electrode.

9. The metal-air battery according to claim 1, further comprising a metal holder including a support having a major surface, wherein
   the metallic electrode is fixed on the major surface,
   the metal holder is configured to allow the metallic electrode and the support to be inserted into the first electrolytic tank, and
   the metal for forming the metallic electrode is supplied into the first electrolytic tank by replacing the metal holder.

10. The metal-air battery according to claim 1, wherein the deliquoring mechanism forms the deliquored product by pressing the precipitate.

11. The metal-air battery according to claim 1, wherein the deliquoring mechanism has a recovery unit for recovering the precipitate at a lower part of a region where the precipitate is formed.

12. The metal-air battery according to claim 1, wherein
the deliquoring mechanism includes a deliquoring unit having a mold member and a first pressing member,
the mold member and the first pressing member are disposed so as to press the precipitate including the electrolytic solution therebetween for forming the deliquored product,
the second electrolytic tank has an opening in a bottom thereof, and
the second electrolytic tank and the deliquoring unit are communicated with each other via the opening.

13. The metal-air battery according to claim 12, wherein the mold member or the first pressing member includes a first filter.

14. The metal-air battery according to claim 1, further comprising a pressing device constituting the deliquoring mechanism, wherein
the pressing device is configured so as to be inserted into the second electrolytic tank and to have a detachably-fixed second pressing member, and
the second pressing member is configured so as to press the precipitate including the electrolytic solution against the bottom of the second electrolytic tank to form the deliquored product when the pressing device is inserted into the second electrolytic tank.

15. The metal-air battery according to claim 1, wherein
the second electrolytic tank has an electrolytic tank unit replaceable with a new electrolytic tank unit, and
when the new electrolytic tank unit is inserted into the second electrolytic tank, the precipitate is pressed between the bottom the second electrolytic tank and the new electrolytic tank unit to form the deliquored product.

16. The metal-air battery according to claim 1, wherein the metallic compound is a metallic oxide or a metallic hydroxide.

17. The metal-air battery according to claim 1, wherein the metallic electrode includes at least one or more metals of Li, Mg, Al, Ca, Zn, Fe, Co, Cd and Pd.

18. The metal-air battery according to claim 1, wherein
the metallic electrode is formed of metallic zinc,
the electrolytic solution is an alkaline aqueous solution, and
the metallic compound includes zinc oxide or zinc hydroxide.

19. An energy system for producing the metal which forms the metallic electrode through a reduction treatment of the deliquored product formed by the metal-air battery according to claim 1 and supplying the metal produced to the first electrolytic tank as the metallic electrode.

* * * * *